(12) United States Patent
Zeira

(10) Patent No.: US 7,593,461 B2
(45) Date of Patent: *Sep. 22, 2009

(54) MULTI-USER DETECTION USING EQUALIZATION AND SUCCESSIVE INTERFERENCE CANCELLATION

(75) Inventor: Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/049,806

(22) Filed: Mar. 17, 2008

(65) Prior Publication Data

US 2008/0240207 A1    Oct. 2, 2008

Related U.S. Application Data

(63) Continuation of application No. 10/748,544, filed on Dec. 30, 2003, now Pat. No. 7,346,103.

(60) Provisional application No. 60/451,591, filed on Mar. 3, 2003.

(51) Int. Cl.
*H03H 7/30* (2006.01)
(52) U.S. Cl. .................. 375/229; 375/346; 327/310; 455/296
(58) Field of Classification Search ............. 375/229, 375/346; 327/310; 455/296
See application file for complete search history.

(56) References Cited

U.S. PATENT DOCUMENTS

| 5,373,507 A | 12/1994 | Skold |
| 5,533,066 A | 7/1996 | Yamaguchi et al. |
| 5,796,776 A | 8/1998 | Lomp et al. |
| 5,933,423 A | 8/1999 | Laakso |
| 6,075,808 A | 6/2000 | Tsujimoto |
| 6,144,711 A | 11/2000 | Raleigh et al. |
| 6,208,295 B1 | 3/2001 | Dogan et al. |
| 6,208,684 B1 | 3/2001 | Yellin et al. |
| 6,252,540 B1 | 6/2001 | Hale et al. |

(Continued)

FOREIGN PATENT DOCUMENTS

DE    196 16 828    11/1997

(Continued)

OTHER PUBLICATIONS

Chen, "Reduced-dimension blind space-time 2-D RAKE receivers for DS-CDMA communication systems", IEEE Transactions on Signal Processing, [see also IEEE Transactions on Acoustics, Speech, and Signal Processing] vol. 48, Issue 6, Jun. 2000 pp. 1521-1536.*

(Continued)

*Primary Examiner*—Juan A Torres
(74) *Attorney, Agent, or Firm*—Volpe and Koenig, P.C.

(57) ABSTRACT

A plurality of signals are received in a shared spectrum. Samples of the received user signals are produced as a received vector. The received vector is segmented into a plurality of segments. For each segment, successively determining symbols for each user or group of signals (the group of signals having similar received power) by determining symbols for one user/group and removing a contribution of that one user/group from the received vector. The determined symbols corresponding to each segment are assembled into a data vector.

16 Claims, 3 Drawing Sheets

U.S. PATENT DOCUMENTS

| | | | |
|---|---|---|---|
| 6,370,129 B1 | 4/2002 | Huang | |
| 6,426,983 B1 | 7/2002 | Rakib et al. | |
| 6,470,000 B1 | 10/2002 | Burns et al. | |
| 6,480,522 B1* | 11/2002 | Hoole et al. | 375/130 |
| 6,501,747 B1 | 12/2002 | Friedlander et al. | |
| 6,707,864 B2 | 3/2004 | Kim | |
| 7,012,909 B2 | 3/2006 | Tanno et al. | |
| 7,430,257 B1* | 9/2008 | Shattil | 375/347 |
| 2002/0018454 A1* | 2/2002 | Misra et al. | 370/336 |
| 2002/0051433 A1* | 5/2002 | Affes et al. | 370/335 |
| 2004/0082356 A1* | 4/2004 | Walton et al. | 455/522 |
| 2004/0086027 A1* | 5/2004 | Shattil | 375/146 |

FOREIGN PATENT DOCUMENTS

| | | |
|---|---|---|
| JP | 2002-330114 | 11/2002 |
| JP | 2003-110474 | 4/2003 |
| JP | 2003-244022 | 8/2003 |
| WO | 01/20801 | 3/2001 |
| WO | 01/69801 | 9/2001 |
| WO | 02/089346 | 11/2002 |

OTHER PUBLICATIONS

Wu, "Lower-complexity direct symbol detector for multiuser MC-CDMA system using antenna array without vector channel estimation", IEEE International Symposium on Circuits and Systems, 2002, ISCAS 2002, vol. 5, May 26-29, 2002 pp. V-5-V-8 vol. 5.*

Zhao, "Reduced-dimension multiuser detection based on grouping users and reducing effective length of spread spectrum code in CDMA systems", EEE International Symposium on Circuits and Systems, 2002, ISCAS 2002, vol. 1, May 26-29, 2002 pp. I-689-I-692 vol. 1.*

Karkkainen, "Performance of an asynchronous DS-CDMA system with long and short spreading codes-a simulation study", Military Communications Conference, 1994. MILCOM '94, Conference Record, 1994 IEEE Oct. 2-5, 1994 pp. 780-784 vol. 3.*

Dmochowski et al., "Frequency Domain Equalization for High Data Rate Multipath Channels," 2001 IEEE Pacific Rim Conference on Communications, Computers and Signal Processing, vol. 2, pp. 534-537, 2001.

Pan et al., "Low Complexity Data Detection Using Fast Fourier Transform Decomposition of Channel Correlation Matrix", Globecom'01 IEEE Global Telecommunications Conference, San Antonio, TX Nov. 25-29, 2001, vol. 2 of 6 pp. 1322-1326, XP001099319, ISBN: 0-7803-7206-9.

Misra et al., "A Computationally Efficient Hybrid Joint Detection and Successive Interference Cancellation", VTC 2001 Spring. IEEE VTS 53$^{rd}$. Vehicular Technology Conference. vol. 3 of 4. Conf 53. May 6, 2001 pp. 1784-1788, XP001082450, ISBN: 0-7803-6728-6.

Tsai et al., "Hybrid MMSE and SIC for Multiuser Detection", VTC 2001 Spring. IEEE VTS 53$^{rd}$. Vehicular Technology Conference. vol. 3 of 4. Conf 53. May 6, 2001 pp. 1779-1783, XP001082449, ISBN: 0-7803-6728-6.

Tsatsanis et al., "Adaptive blind interference cancellation in CDMA systems", Seamless Interconnection for Universal Services; Global Telecommunications Conference, Globecom '99 (Cat. No. 99CH37042);. pp. 487-491 vol. 1a; XP000958336 1999, Piscataway, NJ, USA, IEEE, USA ISBN: 0-7803-5796-5.

Vollmer et al., "Comparative Study of Joint-Detection Techniques for TD-CDMA Based Mobile Radio Systems," IEEE Journal on Selected Areas in Communications, vol. 19, Issue 8, pp. 1461-1475, Aug. 2001.

"Low Cost MMSE-BLE-SD Algorithm for UTRA TDD Mode Downlink", PA Consulting Group/Racal Instruments Ltd., ETSI STC SMG2 Layer 1 Expert Group, Helsinki, Finland, Sep. 8-11, 1998.

Chen, "Reduced-Dimension Blind Space-Time 2-D Rake Receivers for DS-CDMA Communication Systems", IEEE Transactions on Signal Processing, vol. 48, No. 6, pp. 1521-1536, (Jun. 2000).

Haykin, "Adaptive Filter Theory", Third Edition, Prentice Hall, 1996, pp. 87-93.

Karimi et al., "A Novel and Efficient Solution to Block-Based Joint-Detection Using Approximate Cholesky Factorization", Motorola GSM Products Division, Swindon, UK, 1998.

Kärkkäinen et al., "Performance of an Asynchronous DS-CDMA System with Long and Short Spreading Codes—A Simulation Study", Military Communications Conference, 1994., MILCOM '94, Conference Record, 1994 IEEE, Vo. 3, pp. 780-784, (Oct. 2-5, 1994).

Klein et al., "Linear Unbiased Data Estimation in Mobile Radio Systems Applying CDMA", IEEE Journal on Selected Areas in Communications, vol. 11, No. 7, Sep. 1993.

Klein et al., "Zero Forcing and Minimum Mean-Square-Error Equalizer for Multiuser Detection in Code-Division Multiple-Access Channels", IEEE Transactions on Vehicular Technology, vol. 45, No. 2, May 1996.

Klein, "Data Detection Algorithms Specially Designed for the Downlink of CDMA Mobile Radio Systems", IEEE 47$^{th}$ Vehicular Technology Conference, Phoenix, Arizona, USA, May 4-7, 1997.

Wu et al., Lower-Complexity Direct Symbol Detector for Multiuser MC-CDMA System Using Antenna Array without Vector Channel Estimation, IEEE International Symposium on Circuits and Systems, 2002., ISCAS 2002, vol. 5, pp. V-2-V-8, (May 26-29, 2002).

Zhao et al., "Reduced-Dimension Multiuser Detection Based on Grouping Users and Reducing Effective Length of Spread Spectrum Code in CDMA Systems", IEEE International Symposium on Circuits and Systems, 2002., ISCAS 2002, Vo. 1, pp. I-689-I-692, (May 26-29, 2002).

* cited by examiner

MULTI-USER DETECTION USING EQUALIZATION AND SUCCESSIVE INTERFERENCE CANCELLATION

CROSS REFERENCE TO RELATED APPLICATION(S)

This application is a continuation of U.S. patent application Ser. No. 10/748,544, filed Dec. 30, 2003, now U.S. Pat. No. 7,346,103 B2. issued Mar. 18, 2008, which in turn claims priority from U.S. Provisional Application No. 60/451,591, filed Mar. 3, 2003, which is incorporated by reference as if fully set forth.

FIELD OF INVENTION

The invention generally relates to wireless communication systems. In particular, the invention relates to detection of multiple user signals in a wireless communication system.

BACKGROUND

A typical wireless communication system includes base stations which communicate with user equipments (UEs). Each base station has an associated operational area where it communicates with UEs which are in its operational area. In some communication systems, such as code division multiple access (CDMA), multiple communications are sent over the same frequency spectrum. These communications are typically differentiated by their codes.

Since multiple communications may be sent in the same frequency spectrum and at the same time, a receiver in such a system must distinguish between the multiple communications. One approach to detecting such signals is matched filtering. In matched filtering, a communication sent with a single code is detected. Other communications are treated as interference. To detect multiple codes, a respective number of matched filters are used. These signal detectors have a low complexity, but can suffer from multiple access interference (MAI) and inter-symbol interference (ISI).

Other signal detectors attempt to cancel the interference from other users and the ISI, such as parallel interference cancellers (PICs) and successive interference cancellers (SICs). These receivers tend to have better performance at the cost of increased complexity. Other signal detectors detect multiple communications jointly, which is referred to as joint detection. Some joint detectors use Cholesky decomposition to perform a minimum mean square error (MMSE) detection and zero-forcing block equalizers (ZF-BLEs). These detectors tend to have improved performance but high complexities.

Accordingly, it is desirable to have alternate approaches to multi-user detection.

SUMMARY

A plurality of signals are received in a shared spectrum. Samples of the received user signals are produced as a received vector. The received vector is segmented into a plurality of segments. For each segment, successively determining symbols for each user or group of signals (the group of signals having the same channel response) by determining symbols for one user/group and removing a contribution of that one user/group from the received vector. The symbols for each user/group are determined, such as by channel equalization followed by despreading. The determined symbols corresponding to each segment are assembled into a data vector.

BRIEF DESCRIPTION OF THE DRAWING(S)

DETAILED DESCRIPTION OF THE PREFERRED EMBODIMENT(S)

The preferred implementation of the preferred embodiments is in a frequency division duplex (FDD) mode of the third generation partnership project (3GPP) wideband code division multiple access (W-CDMA) communication system. However, the preferred embodiments can be applied to a variety of wireless communication systems.

The preferred embodiments can be utilized at a user equipment (UE) or a base station. A WTRU includes but is not limited to a user equipment, mobile station, fixed or mobile subscriber unit, pager, or any other type of device capable of operating in a wireless environment, such as a base station. A "base station" includes but is not limited to a base station, Node B, site controller, access point or other interfacing device in a wireless environment. Additionally, the preferred embodiments can be applied to UEs communicating with each other.

Figure 1:
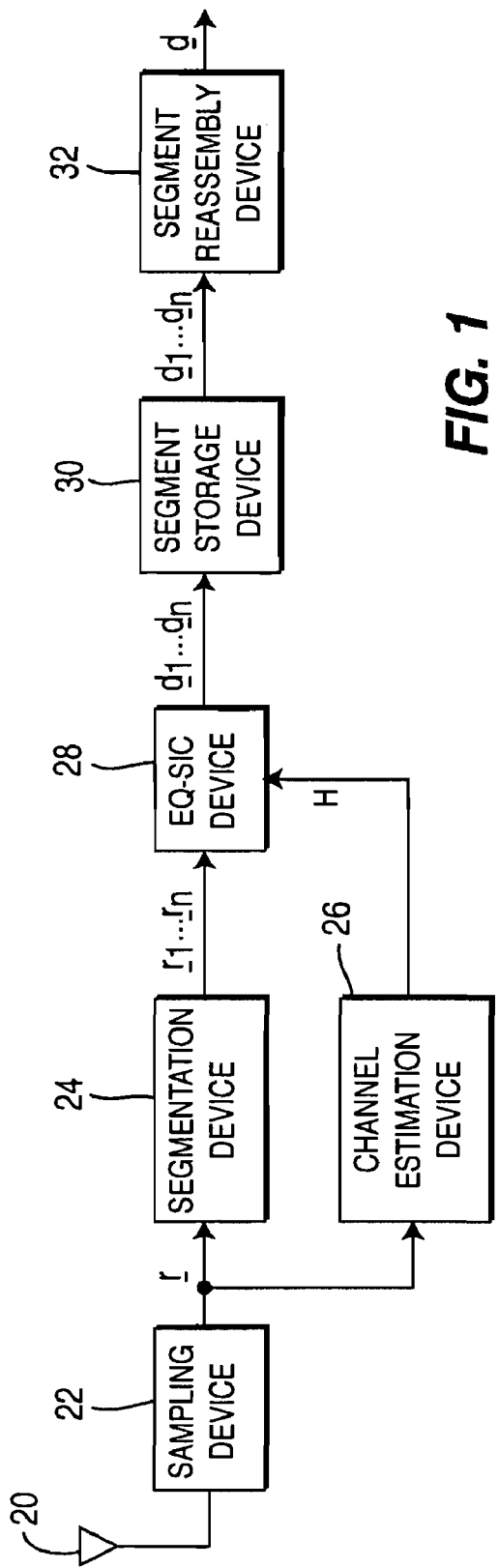
FIG. 1 is a simplified diagram of a equalization successive interference canceller (EQ-SIC) receiver.

FIG. 1 is a simplified diagram of a preferred equalization/successive interference cancellation (EQ-SIC) receiver. Preferably, most of the components shown in FIG. 1, excluding the antenna 20, are implemented as a single integrated circuit. Alternately, the individual components can be discrete components or a mixture of integrated circuit(s) and/or discrete components.

Multiple communications are received by an antenna 20 or antenna array of the receiver. A sampling device 22, such as a single or multiple analog to digital converters (ADCs), samples the received signal to produce a received vector, r.

Figure 2:
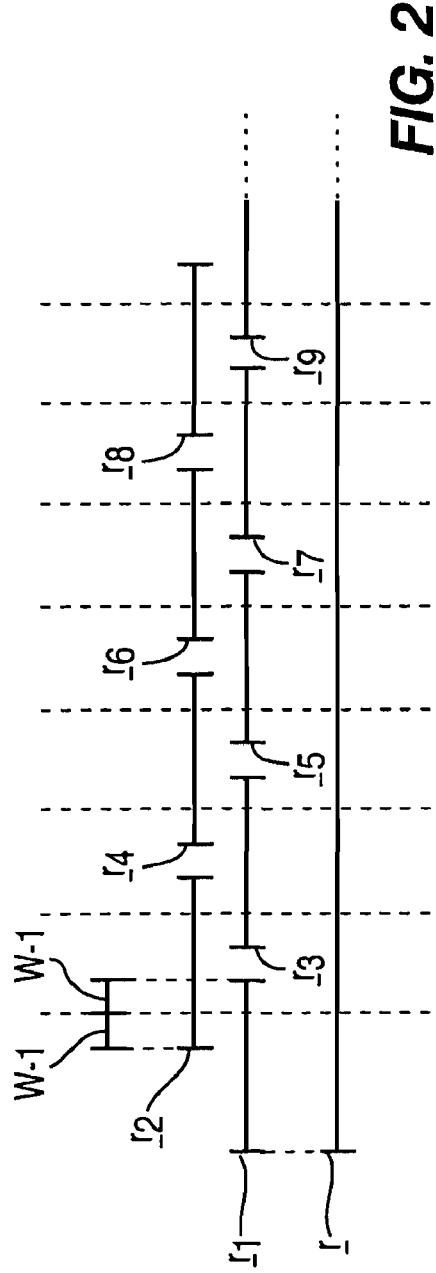
FIG. 2 is an illustration of a preferred segmentation of a received vector r.

The received vector is processed by a segmentation device 24 to produce segments, $r_1 \ldots r_n$, of the received vector r. FIG. 2 is an illustration of a preferred segmentation scheme, although others may be used. As illustrated in FIG. 2, the received vector r is separated into a plurality of segments, $r_1 \ldots r_n$, (only segments $r_1, r_2, r_3, r_4, r_5, r_6, r_7, r_8$ and $r_9$ shown). Preferably, the segments overlap as shown. The amount of the overlap is preferably twice the length the impulse response less one chip, 2*(W-1). W is the maximum length of the channel impulse response, over all channels of all users. This overlap facilitates the equalization of all chips, even though segments have finite length. For a given segment, all of the chips contributing to the portion of interest for that segment are equalized. To illustrate, the portion of interest of $r_2$ is bounded by the dashed lines. The last chip in that portion will extend into the next segment by W-1 chips. Conversely, the chip furthest prior to the first chip in the region of interest extending into that region is W-1 chips prior to the first chip. Accordingly, all chips contributing to the portion of interest and not in that portion can be equalized, effectively removing their contribution from the portion of interest.

Although the overlap is shown as being roughly twice the impulse response, larger overlaps may be used. The larger overlaps may be useful based on the exact receiver implementations. In one embodiment, the EQ-SIC device may use a prime factor algorithm (PFA) fast Fourier transform (FFT) based implementation. The overlap may be extended to reach a desired optimal PFA or FFT length. In other implementations, the optimal non-overlap portions may vary based on the signals being processed. To illustrate, in the time division duplex (TDD) mode of 3GPP W-CDMA, based on the burst type, the length of the data field may vary. As a result, the optimum segment length for one burst may not be optimum for another burst. To utilize one uniform hardware configuration a set size for a segment may be implemented. Different overlaps may be used to facilitate the different burst lengths.

A channel estimation device 26 estimates the channel response for each of the received user signals. Typically, the channel response is estimated using a reference signal, such as a pilot code or a midamble sequence, although other techniques may be used. The estimated channel responses are represented in FIG. 1 as a channel response matrix H.

Figure 3:
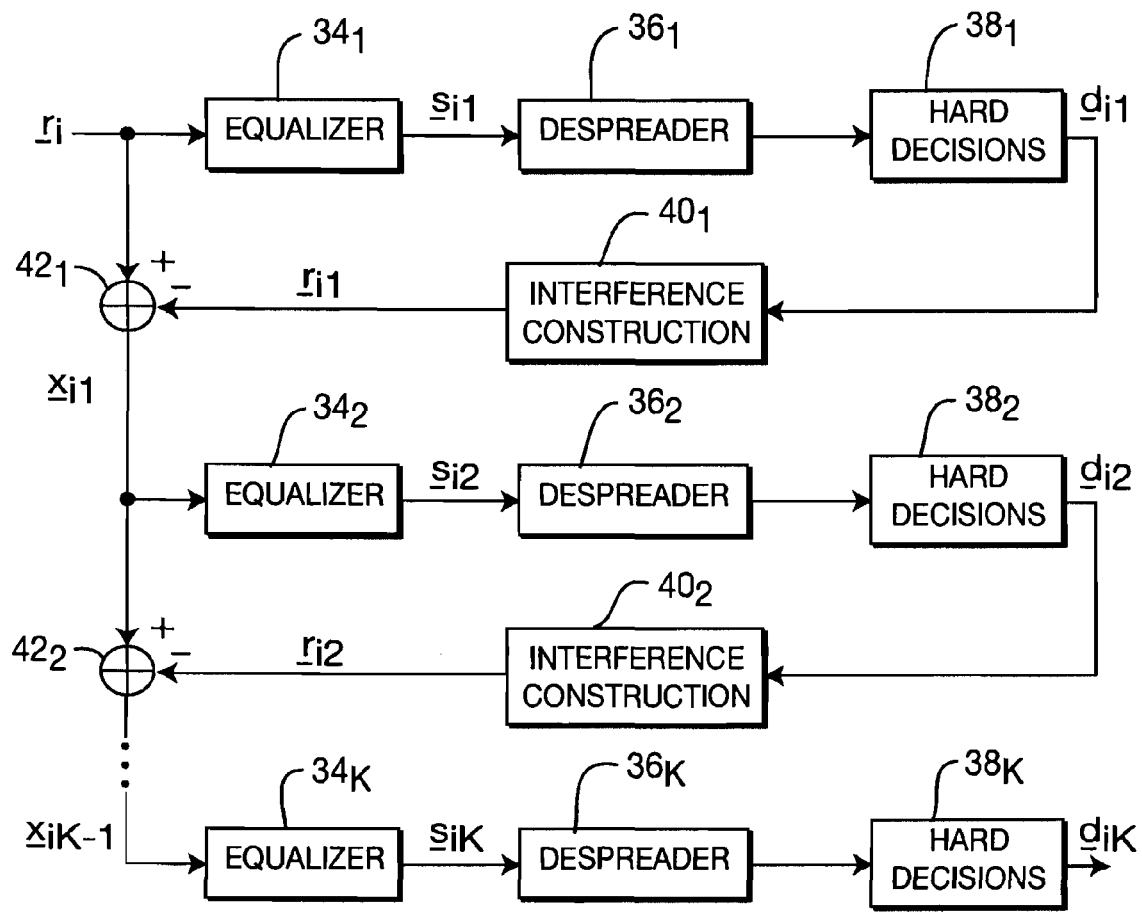
FIG. 3 is a simplified diagram of an EQ-SIC device.

FIG. 3 is an illustration of a preferred EQ-SIC device 28 applied to a received vector segment $r_i$. EQ-SIC device 28 includes equalizers $34_1, 34_2, \ldots, 34_K$ for equalizing vector segments $r_i, x_{i1}, \ldots x_{iK-1}$ configured to produce spread data vectors $s_{i1}, s_{i2}, \ldots, s_{iK}$, respectively. EQ-SIC device 28 also includes despreaders $36_1, 36_2, \ldots, 36_K$ for despreading the spread data vectors $s_{i1}, s_{i2}, \ldots, s_{iK}$, configured to produce soft symbols and hard decision devices $38_1, 38_2, \ldots, 38_K$ configured to produce hard symbols vectors $d_{i1}, d_{i2}, \ldots, d_{iK}$ from the respective soft symbols. EQ-SIC device 28 also includes interference construction devices $40_1, 40_2, \ldots$ for determining respective user contributions $r_{i1}, r_{i2} \ldots$ in each corresponding spread data vector $s_{i1}, s_{i2}, \ldots$ and subtractors $42_1, 42_2 \ldots$ for subtracting respective user contributions $r_{i1}, r_{i2} \ldots$ from respective corresponding vector segments $r_1, x_{i1} \ldots$. In one implementation, all of the user signals are ranked, such as by their received power. For the user having the highest received power, the received vector segment $r_i$ is equalized by a equalizer $34_1$ using the channel response associated with that user (user 1), producing a spread data vector $s_{i1}$. The codes used by that user signal are used to produce soft symbols of that user data by a despreader $36_1$. Hard decisions are performed on that user's soft symbols by a hard decision device $38_1$ to produce a hard symbol vector, $d_{i1}$. Using the detected hard symbols, the contribution of user 1 to the spread data vector is determined, $r_{i1}$, by interference construction device $40_1$. The user 1 contribution is subtracted from the segment by a subtractor $42_1$ producing a new segment $x_{i1}$ having user 1's contribution removed. Similar processing is performed on a second user (user 2) having a second highest received power level. User 2's hard symbols, $d_{i2}$, are detected using an equalizer $34_2$, producing spread data vector $s_{i2}$, despreader $36_2$ and hard decision device $38_2$. The contribution of user 2 to $x_{i1}, r_{i2}$, is removed using an interference construction device $40_2$ and a subtractor $42_2$. This procedure is repeated K-1 times to produce segment $x_{iK-1}$ which is vector ri with the contributions of K-1 users removed. For the $K^{th}$ user, only the hard symbols $d_{iK}$ are determined using an equalizer $34_K$, producing spread data vector $S_{iK}$, despreader $36_K$ and hard decision device $38_K$.

If the EQ-SIC receiver is used at a base station, typically, the hard symbols from all of the users signals are recovered. However, at a UE, the UE EQ-SIC receiver may only have one user's signal of interest. As a result, the successive processing of each user can be stopped after the hard symbols of that user of interest's signals are recovered.

Although the previous description detected each user's signals separately, multiple users signals may be recovered jointly. In such an implementation, the users would be grouped by received signal power. The successive processing would be performed on each group, in turn. To illustrate, the first groups data would be detected and subsequently canceled from the received segment, followed by the second group.

After the data for each user in a segment is detected, the data vector, such as $d_i$, is stored by a segment storage device 30. To reduce the storage size, preferably, the segment is truncated to remove portions not of interest, only leaving the portion of the segment of interest. A segment reassembly device 32 produces a data vector, d, having the data from all the segments, typically by serially combining the data for each user for each segment. To illustrate, the data from user 1 for segment 1, $d_{11}$, is serially combined with the data from user 1 for segment 2, $d_{12}$.

Figure 4:
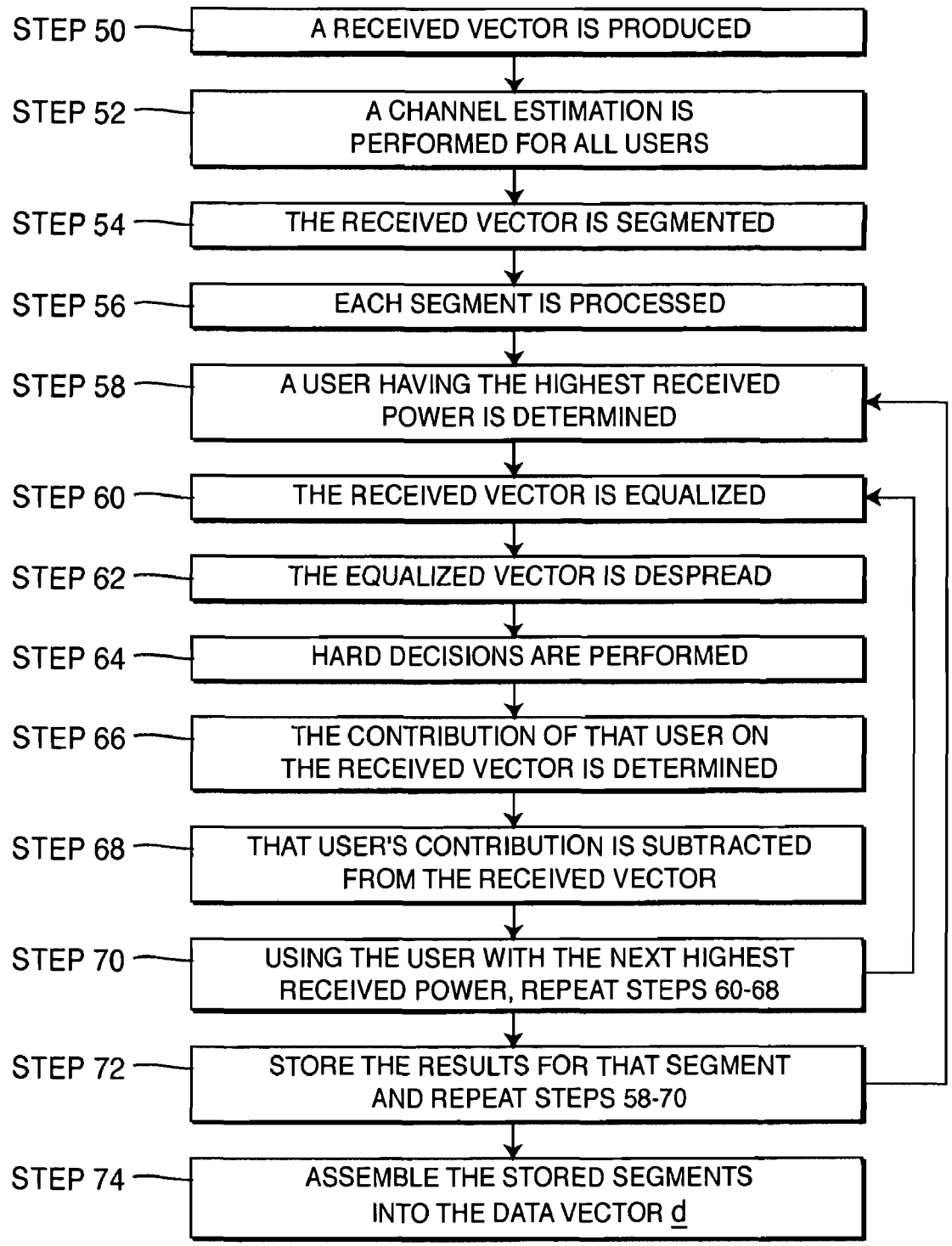
FIG. 4 is a flow chart for an EQ-SIC receiver.

FIG. 4 is a flow chart for an EQ-SIC receiver. Initially, a received vector r is produced, step 50. A channel estimation is performed for all the users, step 52. The received vector is segmented, $r_1 \ldots r_n$, step 54. Each segment is processed, step 56. For an $i^{th}$ segment, a user having the highest received power is determined, step 58. The received vector is equalized for that user, step 60. The resulting spread vector is despread using that user's code, step 62. Hard decisions are performed on the despread data, step 64. The contribution of that user to the received vector is determined, step 66. That user's contribution is subtracted from the received vector, step 68. The next highest received power user is processed by repeating steps 60-68, using the subtracted received vector as the received vector in those steps, step 70. Store the results for that segment and repeat steps 58-70 for each remaining segment, step 72. Assemble the stored segments into the data vector d, step 74. The rate at which channel estimates are made or updated can vary between different implementations, as the rate of updated depends on the time varying nature of the wireless channels.

Preferably, the equalization for each stage of the EQ-SIC device 28 is implemented using FFT, although other implementations may be used. One potential implementation is as follows. Each received segment can be viewed as a signal model per Equation 1.

$$\underline{r_i} = H\underline{s} + \underline{n} \quad \quad \text{Equation 1}$$

H is the channel response matrix. n is the noise vector. s is the spread data vector, which is the convolution of the spreading codes, C, for the user or group and the data vector, d, for the user or group, as per Equation 2.

$$\underline{s} = C \underline{d} \quad \quad \text{Equation 2}$$

Two approaches to solve Equation 3 use an equalization stage followed by a despreading stage. Each received vector segment, $r_i$, is equalized, step 54. One equalization approach uses a minimum mean square error (MMSE) solution. The MMSE solution for each extended segment is per Equation 4A.

$$\underline{\hat{s}_i} = (H_s^H H_s + \sigma^2 I_s)^{-1} H_s^H \underline{r_i} \quad \quad \text{Equation 4A}$$

$\sigma^2$ is the noise variance and $I_s$ is the identity matrix for the extended matrix. $(\cdot)^H$ is the complex conjugate transpose operation or Hermetian operation. The zero forcing (ZF) solution is per Equation 4B $$\underline{\hat{s}_i} = (H_s^H H_s)^{-1} H_s^H \underline{r_i} \quad \quad \text{Equation 4B}$$

Alternately, Equations 4A or 4B is written as Equation 5.

$$\underline{\hat{s}_i} = R_s^{-1} H_s^H \underline{r_i} \quad \quad \text{Equation 5}$$

$R_s$ is defined per Equation 6A corresponding to MMSE.

$$R_s = H_s^H H_s + \sigma^2 I_s \quad \text{Equation 6A}$$

Alternately, $R_s$ for ZF is per Equation 6B.

$$R_s = H_s^H H_s \quad \text{Equation 6B}$$

One preferred approach to solve Equation 5 is by a fast Fourier transform (FFT) as per Equations 7 and 8, an alternate approach to solve Equation is by Cholesky decomposition.

$$R_s = D_z^{-1} \Lambda D_z = (1/P) D_z^* \Lambda D_z \quad \text{Equation 7}$$

$$R_s^{-1} = D_z^{-1} \Lambda^{-1} D_z = (1/P) D_z^* \Lambda^* D_z \quad \text{Equation 8}$$

$D_z$ is the Z-point FFT matrix and $\Lambda$ is the diagonal matrix, which has diagonals that are an FFT of the first column of a circulant approximation of the $R_s$ matrix. The circulant approximation can be performed using any column of the $R_s$ matrix. Preferably, a full column, having the most number of elements, is used.

In the frequency domain, the FFT solution is per Equation 9.

$$F(\hat{s}) = \frac{\sum_{m=1}^{M} F(\underline{h}_m)^* \otimes F(\underline{r}_m)}{F(\underline{q})} \quad \text{Equation 9}$$

where $F(\underline{x}) = \sum_{n=0}^{P-1} x(n) e^{-j\frac{2\pi k n}{N}}$, where $k = 0, 1, \ldots, P-1$ $\otimes$ is the kronecker product. M is the sampling rate. M=1 is chip rate sampling and M=2 is twice the chip rate sampling.

After the Fourier transform of the spread data vector, $F(\hat{\underline{s}})$, is determined, the spread data vector $\hat{\underline{s}}$ is determined by taking an inverse Fourier transform.

What is claimed is:

1. A method of wireless communication, the method comprising:
    receiving user signals in a shared spectrum;
    sampling the received user signals to produce a received vector of a finite chip length;
    segmenting the received vector into a plurality of segments having a selected chip length;
    for each segment successively determining symbols with respect to a selected user; and
    assembling the determined symbols corresponding to each segment into a data vector for the selected user.

2. The method of claim 1 wherein each segment is arranged such that it has a portion overlapping with another segment.

3. The method of claim 2 wherein the overlapping portion is at least two chips less than twice an impulse response length.

4. The method of claim 2 further comprising storing each segment of determined symbols, in response to truncating determined symbols.

5. The method of claim 1 wherein the successively determining symbols includes equalizing an input vector, despreading the equalized vector, and making hard decisions on the despread equalized vector.

6. The method of claim 5 wherein the equalizing includes using a fast Fourier transform.

7. The method of claim 1 performed by a user equipment.

8. The method of claim 1 performed by a base station.

9. A wireless transmit/receive unit (WTRU) comprising:
    an antenna configured to receive a plurality of user signals in a shared spectrum;
    a sampling device configured to produce samples of the received user signals as a received vector of a finite chip length;
    a segmentation device configured to segment the received vector into a plurality of segments having a selected chip length;
    an equalization and successive interference canceller configured to successively determine for each segment symbols for a selected user; and
    a segment reassembly device configured to assemble the determined symbols corresponding to each segment into a data vector for the selected user.

10. The WTRU of claim 9 wherein the segmentation device is configured to segment the received vector into a plurality of segments such that each segment has a portion overlapping with at least one other segment.

11. The WTRU of claim 10 wherein the segmentation device is configured to segment the received vector into a plurality of segments such that the overlapping portion is at least two chips less than twice an impulse response length.

12. The WTRU of claim 10 further comprising a segment storing device configured to store the determined symbols corresponding to each segment, in response to truncating determined symbols.

13. The WTRU of claim 12 wherein the equalization and successive interference canceller comprises an equalizer configured to equalize_an input vector, a despreader configured to despread the equalized vector and a hard decision device configured to make hard decisions on the despread equalized vector.

14. The WTRU of claim 13 wherein the equalizer is configured to equalize the input vector using fast Fourier transforms.

15. The WTRU of claim 9 configured as a user equipment.

16. The WTRU of claim 9 configured as a base station.

* * * * *